2 Sheets—Sheet 1.
C. H. Guard,
Making Carriage Wheels.
N° 9,242. Patented Sep. 7, 1852.
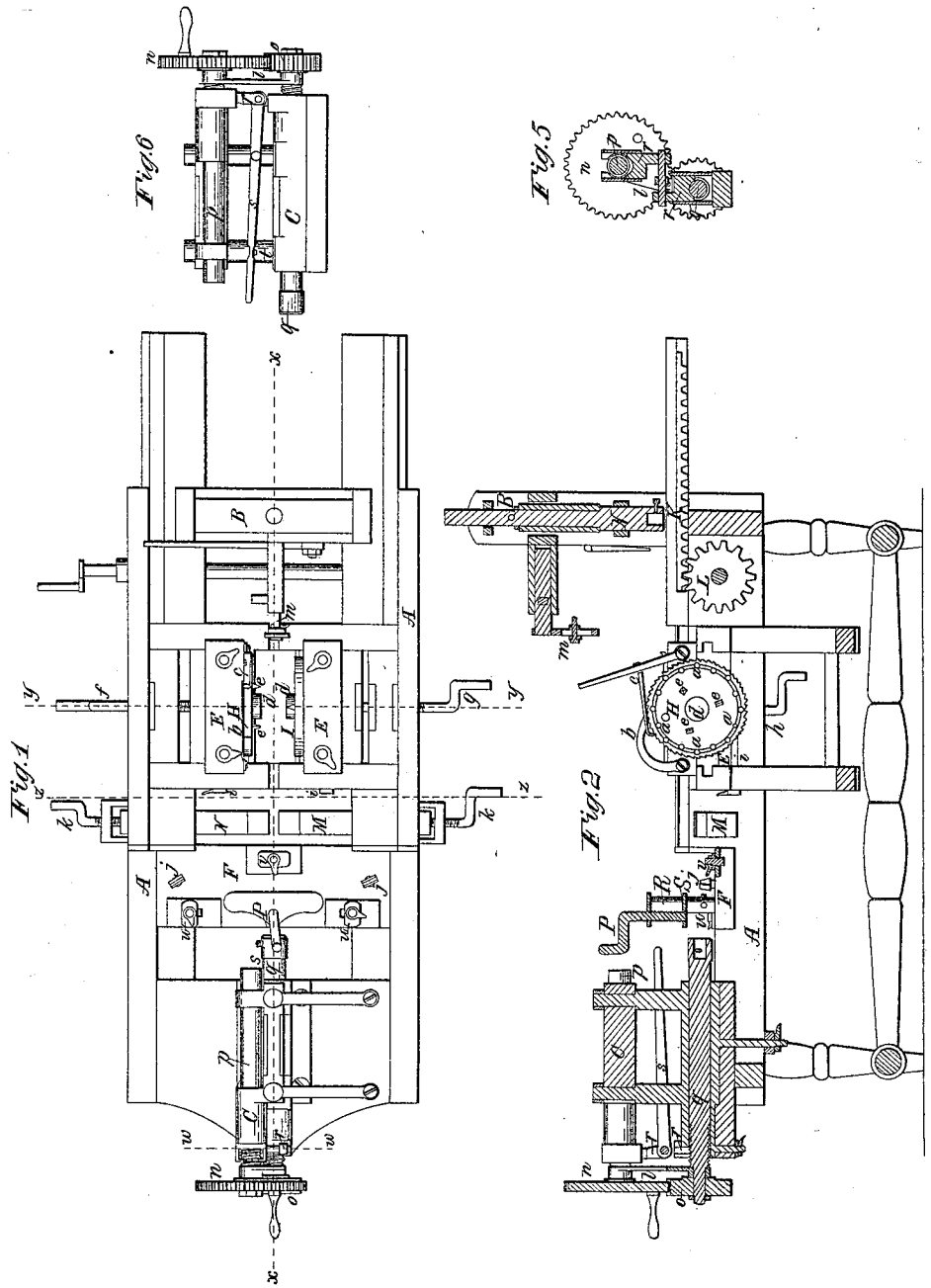

2 Sheets—Sheet 2.
C. H. Guard,
Making Carriage Wheels.
Nº 9,242. Patented Sep. 7, 1852.
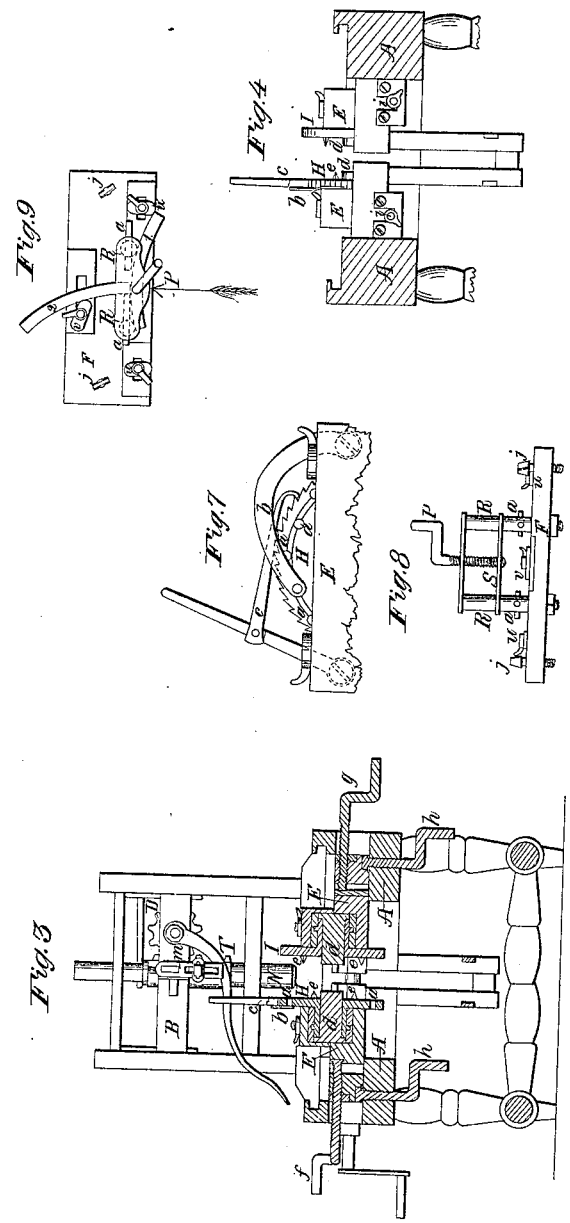

UNITED STATES PATENT OFFICE.

CHAUNCEY H. GUARD, OF BROWNVILLE, NEW YORK.

MACHINE FOR MAKING CARRIAGE-WHEELS.

Specification of Letters Patent No. 9,242, dated September 7, 1852.

*To all whom it may concern:*

Be it known that I, CHAUNCEY H. GUARD, of Brownville, in the county of Jefferson and State of New York, have invented a new and Improved Machine for Constructing Carriage-Wheels; and I do hereby declare that the following is a full and exact description thereof, reference being had to the accompanying drawings, making part of this specification, in which—

Figure 1, is a plan of my improved machine for constructing carriage wheels; Fig. 2, a longitudinal vertical section of the same, in the line $x$, of Fig. 1; Fig. 3, a transverse vertical section, in the line $y$, of Fig. 1; Fig. 4, a transverse, vertical section, in the line $z$, of Fig. 1; Fig. 5, a transverse, vertical section, in the line $w$, of Fig. 1; Figs. 6, 7 and 8, elevations of different parts detached; and Fig. 9, a plan of a part detached, showing the manner of adjusting the fellies for boring.

Like letters refer to like parts in all the figures.

I first construct a suitable frame A, forming a kind of working bench, to which the machinery (hereinafter described) is attached. Said frame is to be constructed of such dimensions as are convenient for the arrangement of the machinery thereon, and for working by. I then construct a kind of mandrel, for holding the hub, in the following manner: Near the center of said frame A, I place upon suitable supports the blocks E, E, the one opposite to the other, and made to slide to or from one another by means of the adjusting screws $f$, $g$. The screw $f$, both drives forward and draws back the block, with which it is connected, but the screw $g$, only drives forward its block, and recedes from it, when reversed, in order that, after the screw has been turned back far enough, its block may be pushed back at once. Adjustable stops $i$, $i$, are provided to limit the distance which said blocks may be moved back. On the inner side of both of said blocks are attached, and have their bearings therein, disks H and I, one facing and parallel with, the other, and each allowed to revolve in its bearing. Each disk is provided with a plug $d$, passing through an aperture in its center, which plug extends somewhat beyond the face of the disk, and is intended to fit in the box hole of the hub, and thus form a guide in adjusting the hub in its place. Plugs of different sizes are provided for different sizes of boxes, and one may be readily substituted for another when the disk is removed from its bearing. The disk H, is provided with projecting points $e$, $e$, &c., or equivalent device, and forms therewith a surface chuck, which holds the hub firmly in its proper position. It is also provided with a series of ratchet teeth on its periphery, into which plays a pall $c$, worked with a lever, by which the hub is caused to revolve at pleasure. Said disk is also furnished with one or two series of apertures $a$, $a$, &c., arranged in a circle at uniform distances from one another, and corresponding in number and distance apart with the spokes of a wheel. Into these holes plays a pin on an index $b$, which, when inserted in one of said apertures, holds the hub fixed in that position, and, when the hub is to be turned to the position for the next spoke, is lifted out of its aperture and slides on the surface of the disk, while turning, till the next aperture is brought under it, when it falls therein and holds the hub firmly in that position.

When a wheel is to be made, the hub is inserted between the above-described disks and chucked firmly therein (the plugs $d$, $d$, fitting within its boxes,) and is adjusted in the right position. The frame, on which the supports E, E, rest, is then adjusted, by the screws $h$, $h$, so as to place the hub in a horizontal position if the wheel is not to be made dishing, but to raise one end of the hub higher than the other, if the wheel is required to be dishing. The hub is then mortised for receiving the spokes by means of a mortising machine B, which is moved on a track by a rack and pinion K, L, so that it may be brought directly over the hub, or moved back to one end of the bench when desired. The apparatus D, T, N, &c., is intended to represent a suitable contrivance for mortising, but forms no part of my invention.

When the spokes are to be driven in the hub, the part F, is to be removed from the frame of the machine, which is also otherwise so arranged that the wheel can revolve without obstruction when the spokes are inserted.

Having mortised the hub the spokes are inserted without removing it from its mandrel. There is a guide $m$, Fig. 3 upon the movable frame of the mortising machine, made adjustable in all directions, which serves as a guide for directing in what position and how far to drive the spokes.

When the fellies are to be bored for the spokes and dowels, I attach the part F, to the frame by means of the screws $j, j$. Said platform F, has two uprights R, R, placed opposite to each other at equal distances from the center of the frame A. A screw P, passes through the center of a fixed plate, which connects the tops of said uprights while its lower end rests and turns in a plate S, which slides up and down between said uprights when the said screw is turned. Through the said uprights, near the platform F, pass the adjustable pins $a, a$, in a line with each other, and are made fast therein by screws. Near the front edge of said platform F, and at suitable distances from the central line of the bench, are inserted two guides $u, u$, made to move toward and from the said central line several inches, in slots, and adjustable therein by screws. A similar guide $v$, is also inserted centrally in the back part of the said platform. The use of these guides is to determine a proper and uniform position for all the fellies of a wheel when they are to be bored. Fig. 9, shows the manner of using said guides. The guides $u, u$, are first adjusted, in positions suitable for the particular size of fellies to be bored for receiving the spokes, in such a manner that, when one end of the felly "1," shall just touch its guide $u$, and its convex side shall rest against the two uprights R, R, it will be in a proper position for boring one hole by an auger moving in the direction of the arrow. The plate S, is then screwed down and holds the felly fast for boring. The felly is then moved over so that its other end will just touch the other guide $u$, and will be in a position exactly corresponding with the first position above described. Its other spoke hole is then bored in a manner similar to the first. The positions of the guides $u, u$, are not to be changed till all the fellies of a wheel have been bored; and any number of fellies of one size may be bored without changing the positions of said guides.

To bore the dowel holes in the ends of the fellies, the guide $v$, and one pin $a$, are so adjusted that the felly "2," touching them both on its concave side, and one end reaching forward to a certain point, the hole will be bored into that end perpendicularly to its radius, by the auger acting in the direction of the arrow. When one end of all the fellies have been bored, the guide $v$, is shifted to a precisely similar position on the other side of the central lines of the frame, and the opposite pin $a$, adjusted in a position like its fellow, in order to bore the other end of each felly. The fellies are secured by the plate S, for boring the dowel holes, in the same manner as for boring the spoke holes.

The fellies are bored by means of the machine C, attached to one end of the bench. Said machine has a socket spindle $q$ (which receives the augers for boring,) having a pinion $o$, on one end, which gears into a cogwheel $n$, of larger size, mounted on a spindle $p$. The said spindle $p$, is also connected with the spindle $q$, by a bar $l$, which is provided with a collar on each end, that clasps each of said spindles. Both spindles are situated in bearings wherein they revolve and move lengthwise freely. A screw is cut on each spindle, the threads of both inclining the same way. A nut $r$, having on each end a portion of a female screw corresponding respectively with the screws on said spindles, is inserted between them in such a manner that being raised so as to gear into the screw of the spindle $p$, it will be ungeared from the spindle $q$, and vice versa. The said nut has a lever $s$, attached to it, by which it is moved up and down to be geared alternately to the spindle $p$, and $q$. When the lever is above the stop $t$, (as represented in Fig. 6 of the drawings,) the nut $r$, will be geared to the spindle $q$; and will be geared to the spindle $p$, when said lever is carried below said stop. When the spindle $q$, is to advance for boring, the nut $r$, is geared to the spindle $p$, and on turning the said spindle to the right, it moves forward, driving with it the spindle $q$, by means of the connecting arm $l$. As soon as the spindle $q$, has advanced far enough, the lever $s$, is raised above its stop $t$, thereby gearing the nut $r$, to the spindle $q$, when, by continuing to turn the spindle $p$, in the same direction as before, the spindle $q$, revolving in the opposite direction, is driven back by its own screw, drawing back also with it the spindle $p$, by means of the arm $l$. And, as the wheel $n$, may be several times larger than the pinion $o$, and the screw thread of the spindle $p$, may be much finer than that of the spindle $q$, the said spindles may be caused to move forward slowly while boring, but return much faster, thereby saving much time and labor. The socket spindle $q$, is also provided with a tenon cutter for cutting the tenons on the ends of the spokes. The spokes are confined for the purpose by means of the clamp jaws M, M.

By means of my above described machine the wheel is prepared for putting on the tires before removing the hub from its mandrel. All the different operations in making it are carried on at one time very conveniently, thereby saving much time; and are performed so accurately by the peculiar arrangement of the machinery that the utmost accuracy of construction is insured.

With this machine, worked by hand, I am enabled to do as much as with an ordinary power machine for the same purpose.

What I claim as my invention, and desire to secure by Letters Patent, is—

The manner of feeding up the boring spindle slowly, and bringing it back speedily, while the driving spindle is turned constantly in one direction and with the same velocity, viz, by connecting the driving spindle $p$, to the boring spindle $q$, by means of the collared bar $l$, and by a cog-wheel $n$, on the former, gearing into a pinion $o$, on the latter, and by screw threads formed upon the said spindles which can be alternately operated upon by the segmental nut $r$, which is placed between them and actuated by the lever $s$, substantially as herein set forth.

The above specification of my improved machine for constructing carriage wheels signed this 8th day of April, 1852.

CHAUNCEY H. GUARD.

Witnesses:
  Z. C. ROBBINS,
  WALTER WHIPPLE.